United States Patent
Yuan et al.

(10) Patent No.: US 9,900,804 B2
(45) Date of Patent: Feb. 20, 2018

(54) METHOD AND DEVICE FOR PROCESSING TO SHARE NETWORK RESOURCES, AND METHOD, DEVICE AND SYSTEM FOR SHARING NETWORK RESOURCES

(71) Applicant: ZTE Corporation, Shenzhen (CN)

(72) Inventors: Bo Yuan, Shenzhen (CN); Liang Fan, Shenzhen (CN); Huaibin Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 54 days.

(21) Appl. No.: 15/106,134

(22) PCT Filed: Jul. 1, 2014

(86) PCT No.: PCT/CN2014/081417
§ 371 (c)(1),
(2) Date: Jun. 17, 2016

(87) PCT Pub. No.: WO2015/090035
PCT Pub. Date: Jun. 25, 2015

(65) Prior Publication Data
US 2017/0034739 A1 Feb. 2, 2017

(30) Foreign Application Priority Data
Dec. 19, 2013 (CN) .......................... 2013 1 0705825

(51) Int. Cl.
*H04W 28/08* (2009.01)
*H04W 4/00* (2018.01)
(Continued)

(52) U.S. Cl.
CPC .......... *H04W 28/085* (2013.01); *H04L 47/20* (2013.01); *H04L 63/08* (2013.01);
(Continued)

(58) Field of Classification Search
None
See application file for complete search history.

(56) References Cited

U.S. PATENT DOCUMENTS 8,281,371 B1 * 10/2012 Chickering ........... G06F 21/577
709/219
2008/0212536 A1 * 9/2008 Lakshmi
Narayanan .............. H04L 29/06
370/331

FOREIGN PATENT DOCUMENTS

CN 101873332 A 10/2010
CN 102123071 A 7/2011
(Continued)

OTHER PUBLICATIONS

International Search Report dated Oct. 14, 2014 re: Application No. PCT/CN2014/081417; pp. 1-2; citing: CN 102123071 A, CN 102123072 A, CN 102594818 A and CN 101873332 A.

*Primary Examiner* — Christine Duong
(74) *Attorney, Agent, or Firm* — Cantor Colburn LLP (57) ABSTRACT

Provided are a method and device for processing to share network resources, and a method, device and system for sharing network resource. The method includes that: a first forwarding rule is sent to an access network device in a network, wherein the first forwarding rule is configured to indicate a rule adopted when the access network device forwards an access protocol message of a first user; the access protocol message forwarded by the access network device according to the first forwarding rule is received; and access authentication is performed on the first user according to the received access protocol message, and after the access authentication is passed, a second forwarding rule is sent to the access network device, wherein the second forwarding rule is configured to indicate a rule adopted
(Continued)

when the access network device forwards a data message of the first user to a service node in the network.

20 Claims, 8 Drawing Sheets

(51) Int. Cl.
*H04L 29/06* (2006.01)
*H04L 29/08* (2006.01)
*H04L 12/813* (2013.01)
*H04W 28/16* (2009.01)
*H04W 12/06* (2009.01)

(52) U.S. Cl.
CPC ........... *H04L 67/1002* (2013.01); *H04W 4/00* (2013.01); *H04W 28/16* (2013.01); *H04W 12/06* (2013.01)

(56) References Cited

FOREIGN PATENT DOCUMENTS

| CN | 102123072 A | 7/2011 |
|---|---|---|
| CN | 102594818 | 7/2012 |

* cited by examiner

METHOD AND DEVICE FOR PROCESSING TO SHARE NETWORK RESOURCES, AND METHOD, DEVICE AND SYSTEM FOR SHARING NETWORK RESOURCES

TECHNICAL FIELD

The present disclosure relates to the field of mobile communications, and in particular to a method and device for processing to share network resources, and a method, device and system for sharing network resources.

BACKGROUND

As a broadband network is popularized on a large scale, a type of an internet service increases with great rapid, the quality of a service is continuously improved and a bandwidth requirement of a user increases rapidly, a broadband access network of a telecom operator faces an increasing load pressure, and a bandwidth capacity expansion speed of the operator cannot follow a demand growth speed of a broadband user gradually. Meanwhile, since diversities of habits and rest time and so on are more and more obvious, a traditional mode of expanding the capacity according to the number of newly-added users is high in cost and cannot meet a network development requirement.

The development of a broadband network needs to depend on sharing large-scale resources to effectively utilize resources, instead of blind physical bandwidth resources. In a traditional broadband network, network bandwidth is planned according to the number of users, so as to share bandwidth resources in cell-level and small-local-spot level, including line bandwidth resources and service node bandwidth resources. In view of a current network development speed, compared with the service node bandwidth resources, the line bandwidth resources are relatively sufficient, and the service node bandwidth resources have obviously encountered a great resource trouble. A representative problem refers to that most of users cannot enjoy a maximum bandwidth at an evening peak period, wherein the maximum bandwidth is promised by the operator. The reasons are that: most of the users are centralized in residential districts of a city at this period of time, the utilization rate of bandwidth resources of service nodes of the residential districts is extremely high, and service nodes of office districts of the city are commonly at a low use rate or even under an idle state. Conversely, the resource utilization rate of broadband network devices in the residential districts of the city within a working period is much lower than that within an evening peak period.

How to solve the problem of resource utilization efficiency of a broadband network so as to utilize existing network resources to the greatest extent, to reduce a frequency of expanding a capacity and to reduce a network cost input, which is one of main problems confronted by global telecom operators currently. In the field of broadband access, the improvement of the resource utilization rate of a service node (namely, a Broadband Access Server (BAS), a Service Router (SR) and other devices) is particularly taken as a main requirement. A mainstream technical solution in the current art is a pooling solution of service nodes, all-weather broadband resource can be reasonably utilized in large-scale regions by means of large-scale service node resource sharing, and peak-valley resource complementation in different regions and resource sharing between different types of users are achieved under limited resources.

In terms of a technical solution for resource pooling of service nodes, resource sharing of user information and network information between different service nodes is achieved firstly, a current mainstream solution refers to a distribution negotiation between the service nodes so as to achieve information all-sharing between the service nodes in a Full Mesh mode. However, as a resource sharing scale gets larger, this mode will inevitably cause the problems of huge quantity of connections and difficult in management, the change of full-network configurations will be inevitably caused by adding and deleting a service node, and the problems of difficult expandability and high management difficulty exist.

Meanwhile, as the type of user service is rich increasingly, requirements on different grades of quality guarantee for different services become more important, and the operator can not only meet requirements on provision of differentiated service for users, but also save network resources.

An effective solution has not been proposed for the problems, in the related art, of difficult expansion, difficult management and the like in a solution of sharing network resources.

SUMMARY

The embodiments of the present disclosure provide a method and device for processing to share network resources, and a method, device and system for sharing network resources, which are intended to at least solve the problems, in the related art, of difficult expansion, difficult management and the like in a solution of sharing network resources.

To this end, according to one embodiment of the present disclosure, a method for processing to share network resources is provided, comprising: sending a first forwarding rule to an access network device in a network, wherein the first forwarding rule is configured to indicate a rule adopted when the access network device forwards an access protocol message of a first user; receiving the access protocol message, wherein the access protocol message is forwarded by the access network device according to the first forwarding rule; and performing access authentication on the first user according to the received access protocol message, and after the access authentication is passed, sending a second forwarding rule to the access network device, wherein the second forwarding rule is configured to indicate a rule adopted when the access network device forwards a data message of the first user to a service node in the network.

In an example embodiment, before sending the second forwarding rule to the access network device, further comprising: acquiring user information of the first user, and acquiring the second forwarding rule according to the acquired user information.

In an example embodiment, the user information comprises: authorization information of the first user.

In an example embodiment, performing the access authentication on the first user according to the received access protocol message comprises: performing the access authentication on the first user according to the access protocol message by means of interaction with an Authorization/Authentication/Accounting (AAA) server.

In an example embodiment, after sending the second forwarding rule to the access network device, further comprising: acquiring load sharing information of a second user bearing between service nodes, wherein the second user belongs to other users, except the first user, among users having accessed the network; and allocating a service node to the first user or an appointed service flow of the first user according to the load sharing information.

In an example embodiment, after allocating the service node to the first user or the appointed service flow of the first user according to the load sharing information, further comprising: sending user information of the first user or information of the appointed service flow of the first user to the allocated service node.

In an example embodiment, when sending the information of the first user or the information of the appointed service flow of the first user to the allocated service node, further comprising: sending the user information or the information of the appointed service flow to a backup node of the service node.

In an example embodiment, the backup node is determined in at least one of following modes: a pre-configuration mode and a dynamic allocation mode.

In an example embodiment, the second forwarding rule carries following information: source address information of the first user, and/or destination address information of the first user.

In an example embodiment, the access network device comprises at least one of: an Ethernet switch; a router; an OpenFlow Logical Switch (OFLS), an OpenFlow Switch (OFS), an Optical Line Terminal (OLT); a Digital Subscriber Line Access Multiplexer (DSLAM), a Residential Gateway (RG), and a Customer Premise Equipment (CPE).

In an example embodiment, the service node comprises at least one of: a Broadband Remote Access Server (BRAS); a Broadband Network Gateway (BNG), a Broadband Service Gateway (BSG), a Service Router (SR); a Broadband Access Server (BAS), an OpenFlow Logical Switch (OFLS), an OpenFlow Switch (OFS).

According to another embodiment, a method for sharing network resources is provided, comprising: receiving a first forwarding rule of a first user in a network; sending an access protocol message of the first user to a service node control device according to the first forwarding rule; receiving a second forwarding rule, sent by the service node control device after authentication on the first user according to the access protocol message is passed, of the first user; and forwarding a data message of the first user to a service node in the network according to the second forwarding rule.

In an example embodiment, forwarding the data message of the first user to the service node in the network according to the second forwarding rule comprises: acquiring an appointed service node, wherein the appointed service node is allocated to the first user by the service node control device according to load sharing information of a second user bearing between service nodes, the second user belongs to other users, except the first user, among users having accessed the network; and forwarding the data message to the appointed service node according to the second forwarding rule.

According to an embodiment, a device for sharing network resources is provided, comprising: a first sending component, configured to send a first forwarding rule to an access network device in a network, wherein the first forwarding rule is configured to indicate a rule adopted when the access network device forwards an access protocol message of a first user; a receiving component, configured to receive the access protocol message, wherein the access protocol message is forwarded by the access network device according to the first forwarding rule; an authentication component, configured to perform access authentication on the first user according to the received access protocol message; and a second sending component, configured to send, after the access authentication is passed, a second forwarding rule to the access network device, wherein the second forwarding rule is configured to indicate a rule adopted when the access network device forwards a data message of the first user to a service node in the network.

In an example embodiment, further comprising: an acquiring component, configured to acquire load sharing information of a second user bearing between service nodes, wherein the second user belongs to other users, except the first user, among users having accessed the network; and an allocation component, configured to allocate a service node to the first user or an appointed service flow of the first user according to the load sharing information.

According to another embodiment, a device for sharing network resources is provided, comprising: a first receiving component, configured to receive a first forwarding rule of a first user in a network; a sending component, configured to send an access protocol message of the first user to a service node control device according the first forwarding rule; a second receiving component, configured to receive a second forwarding rule, sent by the service node control device after authentication on the first user according to the access protocol message is passed, of the first user; and a forwarding component, configured to forward a data message of the first user to a service node in the network according to the second forwarding rule.

In an example embodiment, the forwarding component comprises: an acquiring element, configured to acquire an appointed service node, wherein the appointed service node is allocated to the first user by the service node control device according to load sharing information of a second user bearing between service nodes, the second user belongs to other users, except the first user, among users having accessed the network; and a forwarding element, configured to forward the data message to the appointed service node according to the second forwarding rule.

According to another embodiment, a service node control device is provided, comprising one of the above devices for processing to share the network resources.

According to another embodiment, an access network device is provided, comprising one of the above the devices for sharing the network resources.

According to another embodiment, a system for sharing network resources is provided, comprising: an access protocol processing device, configured to receive an access protocol message of a first user from an access network device, and perform access authentication on the first user according to the received access protocol message; a service node control device, configured to send a first forwarding rule and a second forwarding rule to the access network device, wherein the first forwarding rule is configured to indicate a rule adopted when the access network device forwards the access protocol message of the first user; the access network device, configured to receive the first forwarding rule and the second forwarding rule, forward the access protocol message of the first user to the access protocol processing device according to the first forwarding rule, and forward a data message of the first user to a service node in a network according to the second forwarding rule; and the service node, configured to receive the data message.

By means of the embodiments of the present disclosure, the technical solution is adopted as follows: an access protocol message of a user forwarded by an access network device according to a first forwarding rule is received, access authentication is performed on a first user according to the access protocol message, and a second forwarding rule, configured to indicate a rule adopted when the access network device forwards a data message of the first user to a service node in a network, is sent to the access network device after the access authentication is passed. The problems, in the related art, of difficult expansion, difficult management and the like in a solution of sharing network resources are solved. The unified management on large-scale service node resources is implemented, the above problems are effectively solved, and the user management efficiency and the differentiated service quality are improved.

BRIEF DESCRIPTION OF THE DRAWINGS

The drawings illustrated herein are intended to provide further understanding of the present disclosure, and constitute a part of the present disclosure. The schematic embodiments and illustrations of the present disclosure are intended to explain the present disclosure, and do not form improper limits to the present disclosure. In the drawings.

DETAILED DESCRIPTION OF THE EMBODIMENTS

The present disclosure will be illustrated below with reference to the drawings and the embodiments in detail. It is important to note that the embodiments of the present disclosure and the characteristics in the embodiments can be combined under the condition of no conflicts.

Figure 1:
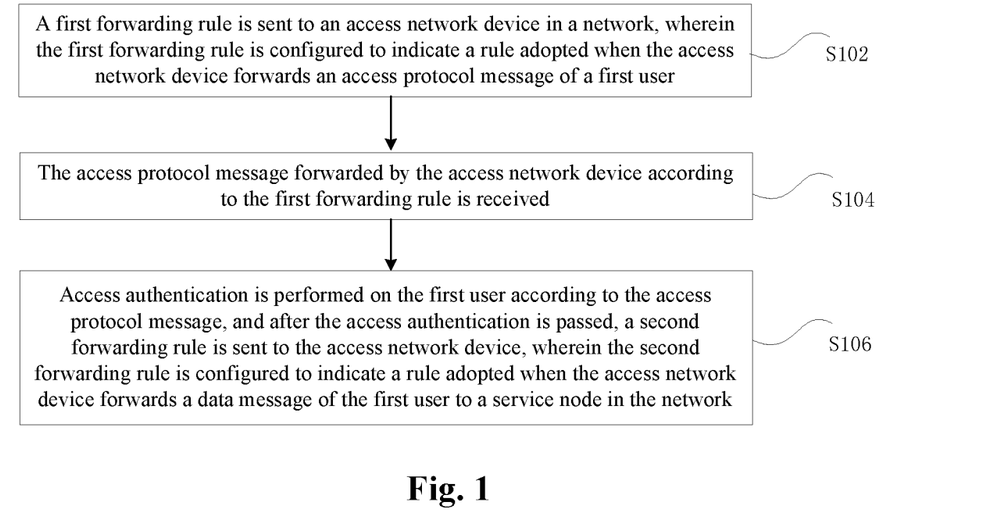
FIG. 1 is a flow chart of a method for processing to share network resources according to an embodiment of the present disclosure.

FIG. 1 is a flow chart of a method for processing to share network resources according to an embodiment of the present disclosure. As shown in FIG. 1, the method includes Step S102 to Step S106 as follows.

S102: A first forwarding rule is sent to an access network device in a network, wherein the first forwarding rule is configured to indicate a rule adopted when the access network device forwards an access protocol message of a first user.

It is important to note that the first forwarding rule may match some characteristic protocol fields such as a Point-to-Point Protocol (PPP) control protocol field and a serial number of Dynamic Host Configure Protocol (DHCP).

S104: The access protocol message forwarded by the access network device according to the first forwarding rule is received.

S106: Access authentication is performed on the first user according to the access protocol message, and after the access authentication is passed, a second forwarding rule is sent to the access network device, wherein the second forwarding rule is configured to indicate a rule adopted when the access network device forwards a data message of the first user to a service node in the network. It is important to note that the second forwarding rule contains source address information of the first user, and/or destination address information of the first user, and the source address information and/or the destination address information are/is intended to accurately determine a path in a process of sending the second forwarding rule.

In this embodiment, a process of specifically performing the access authentication on the first user refers to: access authentication is performed on the first user according to the access protocol message by means of interaction with an AAA server.

In this step, before the second forwarding rule is sent to the access network device, user information of the first user may further be acquired, and the second forwarding rule may be acquired according to the user information, wherein the user information includes: authorization information of the first user.

After Step S104, load sharing information of a second user bearing between service nodes, may further be acquired, wherein the second user belongs to other users, except the first user, among users having accessed the network; and a service node is allocated to the first user or an appointed service flow of the first user according to the load sharing information. Information of the first user or information of the appointed service flow of the first user is sent to the service node. Meanwhile, the information of the first user or the information of the appointed service flow of the first user is sent to a backup node of the service node, wherein the backup node of the service node may be determined in a dynamic allocation mode or a pre-configuration mode.

In this embodiment, the service node may include: a BRAS, a BNG, a BSG, an SR, a BAS, an OFLS and an OFS.

Furthermore, an access network device node may include: an Ethernet switch, a router, an OFLS, an OFS, an OLT, a DSLAM, an RG and a CPE.

By means of each step, the technical solution is adopted as follows: an access protocol message of a user forwarded by an access network device according to a first forwarding rule is received, access authentication is performed on a first user according to the access protocol message, and a second forwarding rule, configured to indicate a rule adopted when the access network device forwards a data message of the first user to a service node in a network, is sent to the access network device after the authentication is passed is adopted. The problems, in the related art, of difficult expansion, difficult management and the like in a solution of sharing network resources are solved. The unified management on large-scale service node resources is implemented, the above problems are effectively solved, and the user management efficiency and the differentiated service quality are improved. Moreover, the utilization efficiency of resources between service nodes is also improved, and the differentiated service quality and the user experience are effectively improved.

It is important to note that an executive body of the method may be, but is not limited to, a service node control device in the network. In addition, the access authentication on the access protocol message in Step S106 may be implemented by an access protocol processing device. Certainly, the access protocol processing device may also serve as a part of the service node control device.

Figure 2:
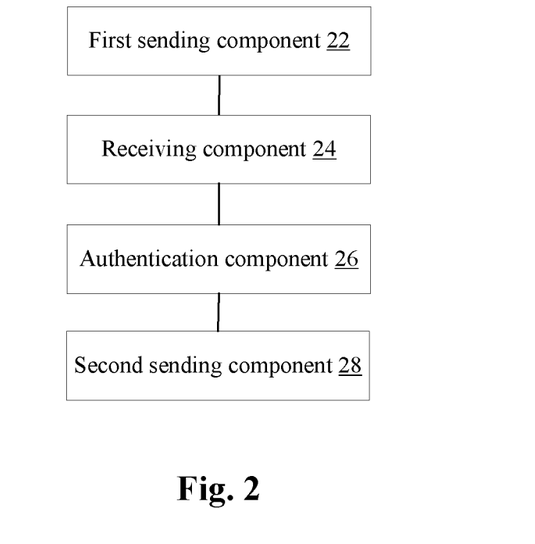
FIG. 2 is a structure block diagram of a device for processing to share network resources according to an embodiment of the present disclosure.

In this embodiment, a device for processing to share network resources is further provided, which is configured to implement the above embodiment and example implementation mode. Those which have been illustrated will not be elaborated herein. Components involved in the device are illustrated below. Just as a term 'component' used below, the combination of software and/or hardware with predetermined functions may be implemented. Although the device described by the following embodiment is better implemented by software, the implementation of hardware or the combination of software and hardware may be possible and conceived. FIG. 2 is a structure block diagram of a device for processing to share network resources according to an embodiment of the present disclosure. As shown in FIG. 2, the apparatus includes:

a first sending component 22, configured to send a first forwarding rule to an access network device in a network, wherein the first forwarding rule is configured to indicate a rule adopted when the access network device forwards an access protocol message of a first user;

a receiving component 24, connected to the first sending component 22, and configured to receive the access protocol message forwarded by the access network device according to the first forwarding rule;

an authentication component 26, connected to the receiving component 24, and configured to perform access authentication on the first user according to the access protocol message; and a second sending component 28, connected to the authentication component 26, and configured to send, after the access authentication is passed, a second forwarding rule to the access network device, wherein the second forwarding rule is configured to indicate a rule adopted when the access network device forwards a data message of the first user to a service node in the network.

Figure 3:
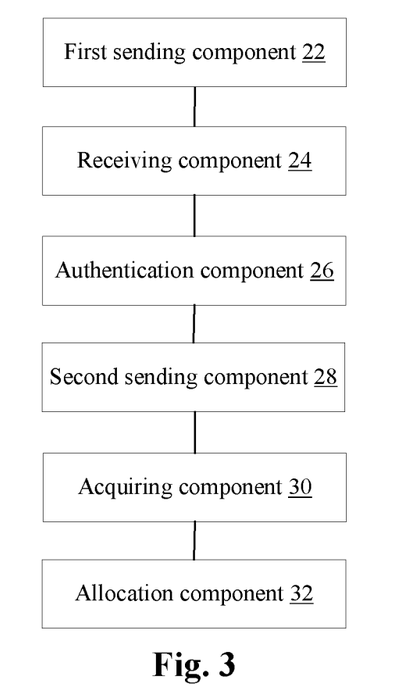
FIG. 3 is another structure block diagram of the device for processing to share network resources according to an embodiment of the present disclosure.

The further improvement of the technical solution in this embodiment is as follows. As shown in FIG. 3, the device further includes: an acquiring component 30, configured to acquire load sharing information of a second user bearing between service nodes, wherein the second user belongs to other users, except the first user, among users having accessed the network; and an allocation component 32, connected to the acquiring component 30, and configured to allocate a service node to the first user or an appointed service flow of the first user according to the load sharing information.

Wherein, the acquiring component 30 is further configured to acquire user information of the first user and acquire the second forwarding rule according to the user information.

Under the action of each component, the technical solution is adopted as follows: the receiving component 24 receives an access protocol message of a user, wherein the access protocol message is forwarded by the first sending component 22 according to a first forwarding rule and received by an access network device, access authentication is performed on a first user by the authentication component 26 according to the access protocol message, and the second sending component 28 sends a second forwarding rule, configured to indicate a rule adopted when the access network device forwards a data message of the first user to a service node in a network, to the access network device after the access authentication is passed. The problems, in the related art, of difficult expansion, difficult management and the like in a sharing solution of a network resource are solved. The unified management on large-scale service node resources is implemented, the above problems are effectively solved, and the user management efficiency and the differentiated service quality are improved. Moreover, the utilization efficiency of resources between service nodes is also improved, and the differentiated service quality and the user experience are effectively improved.

In this embodiment, a service node control device is further provided, which includes the above device for processing to share network resources.

Figure 4:
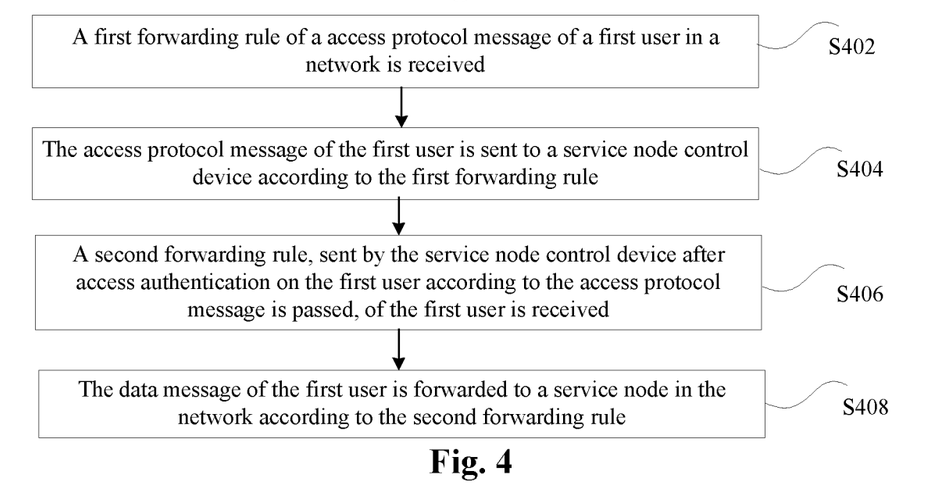
FIG. 4 is a flow chart of a method for sharing network resources according to an embodiment of the present disclosure.

An embodiment of the present disclosure further provides a method for sharing network resources. FIG. 4 is a flow chart of a method for sharing network resources according to an embodiment of the present disclosure. As shown in FIG. 4, the method includes Step S402 to Step S408 as follows.

S402: A first forwarding rule for forwarding an access protocol message of a first user in a network is received.

S404: An access protocol message of the first user is sent to a service node control device according to the first forwarding rule.

S406: A second forwarding rule, sent by the service node control device after authentication on the first user according to the access protocol message is passed, of the first user is received.

S408: The data message of the first user is forwarded to a service node in the network according to the second forwarding rule.

In order to execute Step S408, it is necessary to execute the following process that: an appointed service node allocated to the first user by the service node control device according to load sharing information of a second user between service nodes is acquired, wherein the second user belongs to other users, except the first user, among users having accessed the network. Specifically, the step may be executed by the service node control device, that is, load sharing information of the second user may be acquired by the service node control device. A service node is allocated to the first user or an appointed service flow of the first user according to the load sharing information.

It is important to note that an executive body of Step S402 to Step S408 may be, but is not limited to, an access network device. Specifically, an access network device node may include: an Ethernet switch, a router, an OFLS, an OFS, an OLT, a DSLAM, an RG and a CPE. In this embodiment, the executive body may further execute the following steps that: the second forwarding rule of the access protocol message of the first user in the network is received, wherein the access protocol message is configured for the service node control device to perform access authentication on the first user; and the access protocol message is forwarded in accordance with the second forwarding rule.

By means of each step, the technical solution is adopted as follows: an access protocol message of a first user is sent to a service node control device according to a received first forwarding rule of the first user in a network, a second forwarding rule is sent after the service node control device authenticates the first user according to the access protocol message and the authentication is passed, and a data message of the first user is forwarded to a service node in the network according to the second forwarding rule. The problems, in the related art, of difficult expansion, difficult management and the like in a solution of sharing a network resource are solved. The unified management on large-scale service node resources is implemented, the above problems are effectively solved, and the user management efficiency and the differentiated service quality are improved. Moreover, the utilization efficiency of resources between service nodes is also improved, and the differentiated service quality and the user experience are effectively improved.

Figure 5:
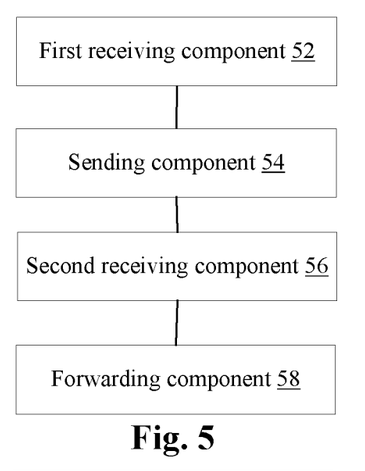
FIG. 5 is a structure block diagram of a device for sharing network resources according to an embodiment of the present disclosure.

In this embodiment, a device for sharing network resources is further provided, which is configured to implement the above embodiment and example implementation mode. Those which have been illustrated will not be elaborated herein. Components involved in the device are illustrated below. Just as a term 'component' used below, the combination of software and/or hardware with predetermined functions may be implemented. Although the apparatus described by the following embodiment is better implemented by software, the implementation of hardware or the combination of software and hardware may be possible and conceived. FIG. 5 is a structure block diagram of a device for sharing network resources according to an embodiment of the present disclosure. As shown in FIG. 5, the apparatus includes:

a first receiving component 52, configured to receive a first forwarding rule of a first user in a network;

a sending component 54, connected to the first receiving component 52, and configured to send an access protocol message of the first user according to the first forwarding rule;

a second receiving component 56, connected to the sending component 54, and configured to receive a second forwarding rule, sent by a service node control device after authentication on the first user according to the access protocol message is passed, of the first user; and a forwarding component 58, connected to the second receiving component 56, and configured to forward a data message of the first user to a service node in the network according to the second forwarding rule.

Figure 6:
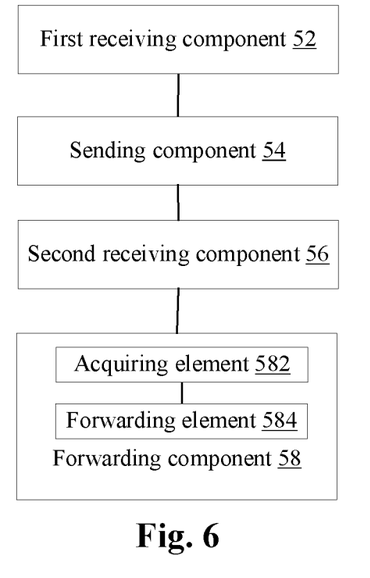
FIG. 6 is another structure block diagram of the device for sharing network resources according to an embodiment of the present disclosure.

In this embodiment, as shown in FIG. 6, the forwarding component 58 includes: an acquiring element 582, configured to acquire an appointed service node allocated to the first user by the service node control device according to load sharing information of a second user bearing between service nodes, wherein the second user belongs to other users, except the first user, among users having accessed the network; and a forwarding element 584, connected to the acquiring element 582, and configured to forward the data message to the appointed service node according to the second forwarding rule.

Under the action of each component, the technical solution is adopted as follows: the sending component 54 sends an access protocol message of a first user to a service node control device according to a first forwarding rule of the first user in a network, wherein the first forwarding rule is received by the first receiving component 52, the second sending component 56 sends a second forwarding rule after the service node control device authenticates the first user according to the access protocol message and the authentication is passed, and the forwarding component 58 forwards a data message of the first user to a service node in the network according to the second forwarding rule. The problems, in the related art, of difficult expansion, difficult management and the like in a solution of sharing a network resource are solved. The unified management on large-scale service node resources is implemented, the above problems are effectively solved, and the user management efficiency and the differentiated service quality are improved. Moreover, the utilization efficiency of resources between service nodes is also improved, and the differentiated service quality and the user experience are effectively improved.

In this embodiment, an access network device is further provided, which includes the above device for sharing network resources.

Figure 7:
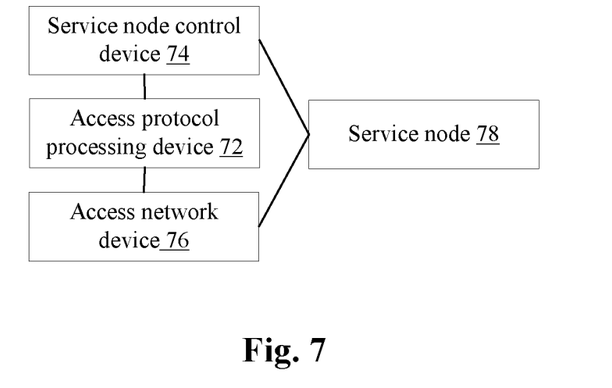
FIG. 7 is a structure block diagram of a system for sharing network resources according to an embodiment of the present disclosure.

In this embodiment of the present disclosure, a system for sharing network resources is further provided. As shown in FIG. 7, the system may include: an access protocol processing device 72, configured to receive an access protocol message of a first user from an access network device, and perform access authentication on the first user according to the access protocol message;

a service node control device 74, connected to the access protocol processing device 72, and configured to send a first forwarding rule and a second forwarding rule to the access network device, wherein the first forwarding rule is configured to indicate a rule adopted when the access network device forwards the access protocol message of the first user;

an access network device 76, connected to the service node control device 74, and configured to receive the first forwarding rule and the second forwarding rule, forward the access protocol message of the first user to the access protocol processing device according to the first forwarding rule, and forward a data message of the first user to a service node in a network according to the second forwarding rule; and a service node 78, connected to the access network device 76 and the service node control device 74, and configured to receive the data message.

It is important to note that the access protocol processing device and the service node control device may be devices independent of each other, or the access protocol processing device may be a part of the service node control device.

In the embodiments of the present disclosure, by introducing a service node control device, the unified management of large-scale service node resources is implemented. As a core of the present disclosure, the service node control device is further configured to acquire user information of the first user and acquire the first forwarding rule according to the user information after the authentication is passed; and the service node control device is further configured to send a second forwarding rule of the access protocol message to the access network device, wherein the second forwarding rule is configured to indicate a rule adopted when the access network device forwards the access protocol message.

A process of specifically performing access authentication on the first user refers to: access authentication is performed on the first user according to the access protocol message by means of interaction with an AAA server. In this embodiment, the AAA server is a device independent of the service node control device, or the AAA server is a part of the service node control device.

In order to better understand a process of processing to share network resources or a process of sharing the network resources in the embodiments, the present disclosure is illustrated below with reference to example embodiments in detail. It is important to note that the solutions of the example embodiments do not form limits to the present disclosure.

Example Embodiment 1

Figure 8:
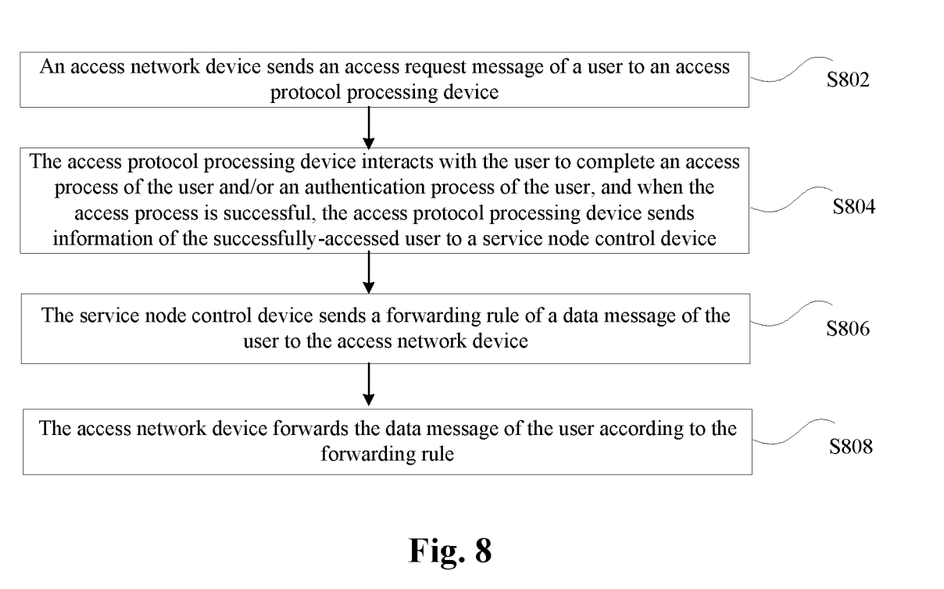
FIG. 8 is a flow chart of an implementation method for sharing network resources according to an example embodiment of the present disclosure.
Figure 9:
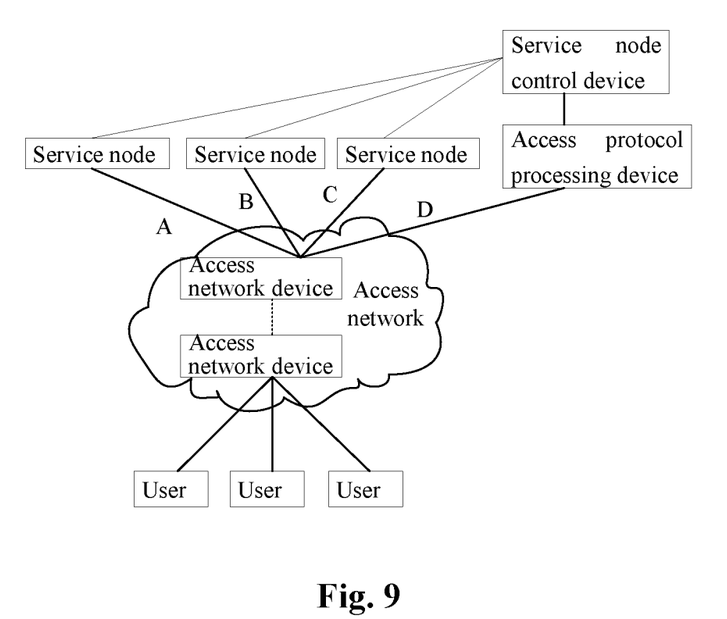
FIG. 9 is a diagram illustrating networking for sharing network resources according to an example embodiment of the present disclosure.

FIG. 8 is a flow chart of an implementation method for sharing network resources according to an example embodiment of the present disclosure. FIG. 9 is a diagram illustrating networking for sharing network resources according to an example embodiment of the present disclosure. As shown in FIG. 8, the method includes the steps as follows.

Step S802: An access network device sends an access request message of a user to an access protocol processing device.

Step S804: The access protocol processing device interacts with the user to complete an access process of the user and/or an authentication process of the user, and when the access process is successful, the access protocol processing device sends user information of the successfully-accessed user to a service node control device.

Furthermore, the service node control device interacts with an AAA server in an authentication process to perform user authentication information verification.

Step S806: The service node control device sends a forwarding rule of a data message of the user to the access network device.

Furthermore, the service node control device performs load sharing between all service nodes according to information of currently-accessed user, and appoints a service node for the newly-accessed user or specific service traffic of the newly-accessed user.

Furthermore, the service node control device appoints identical or different service nodes for different types of specific service traffics of the newly-accessed user to be processed.

Furthermore, a matching condition of the rule includes source address information of the user and/or destination address information of the user.

Furthermore, there may be one or more access network devices, wherein the access network device in Step S802 may include one or more devices between the user and the access protocol processing device, the access network device in Step S806 may include one or more devices between the user and an upper network, and both the access network devices are sub-sets or universal set of all access network devices.

Furthermore, the service node control device sends the information newly-accessed user or specific traffic information about the newly-accessed user to both the appointed service node and a backup node of the appointed service node.

Furthermore, the backup node of the service node is dynamically appointed by the service control device or appointed in a static configuration mode.

Furthermore, the information newly-accessed user includes authorization information of the newly-accessed user.

Step S808: The access network device forwards the data message of the user according to the forwarding rule.

Furthermore, the service node processes the data message of the user according to the information newly-accessed user or the specific traffic information of the newly-accessed user.

Furthermore, the access protocol processing device is a device independent of the service node control device, or the access protocol processing device is a part of the service node control device.

Furthermore, the AAA server is a device independent of the service node control device, or the AAA server is a part of the service node control device.

Furthermore, the service node includes: a BRAS, a BNG, a BSG, an SR, a BAS, an OFLS and an OFS.

Furthermore, an access network device node includes: an Ethernet switch, a router, an OFLS, an OFS, an OLT, a DSLAM, an RG and a CPE.

Example Embodiment 2

Figure 10:
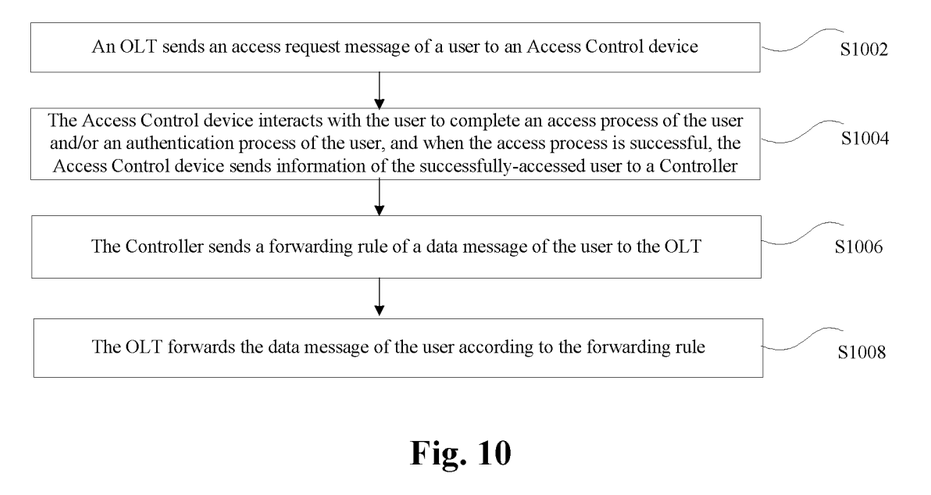
FIG. 10 is a flow chart of a method under a bandwidth resource scenario according to an example embodiment of the present disclosure.
Figure 11:
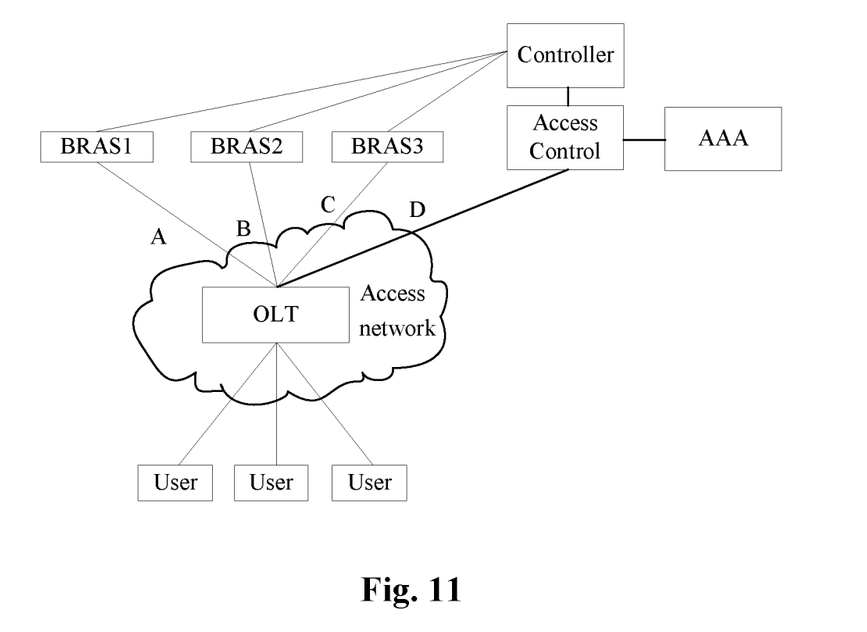
FIG. 11 is a diagram illustrating networking for adjusting bandwidth resource scenario according to an example embodiment of the present disclosure.

In a bandwidth resource adjustment scenario, FIG. 10 is a flow chart of a method under a bandwidth resource scenario according to an example embodiment of the present disclosure, and FIG. 11 is a networking diagram illustrating bandwidth resource scenario adjustment according to a preferred embodiment of the present disclosure. A Controller in FIG. 11 is equivalent to a service node control device in the above embodiment, a BRAS1, a BRAS2 and a BRAS3 are equivalent to service nodes in the above embodiment, an OLT is equivalent to an access network device in the above embodiment, and an Access Control is equivalent to an access protocol processing device in the above embodiment. The flow shown in FIG. 10 includes the steps as follows.

Step S1002: An OLT sends an access request message of a user to an Access Control device.

Step S1004: The Access Control device interacts with the user to complete an access process of the user and/or an authentication process of the user, and when the access process is successful, the Access Control device sends information of the successfully-accessed user to a Controller.

Furthermore, the Access Control device interacts with an AAA server in an authentication process to perform user authentication information verification.

Step S1006: The Controller sends a forwarding rule of a data message of the user to the OLT.

Furthermore, the Controller performs load sharing among a BRAS1, a BRAS2 and a BRAS3 according to information of currently-accessed user, and appoints a service node (such as the BRAS1) for the newly-accessed user.

Furthermore, a matching condition of the rule includes source address information about the user.

Furthermore, the Controller sends the information of the newly-accessed user to both the appointed service node (such as the BRAS1) and a backup node (such as the BRAS2) of the appointed service node.

Furthermore, the backup node of the service node is dynamically appointed by the service control device or appointed in a static configuration mode.

Step S1008: The OLT forwards the data message of the user according to the forwarding rule.

Furthermore, the service node processes the data message of the user according to the information of the newly-accessed user.

Furthermore, the Access Control device is a device independent of the Controller, or the Access Control device is a part of the Controller.

Furthermore, the OLT is connected to the Controller via a link D, wherein the link D is a real physical link or a routability logical path.

Furthermore, the BRAS1, the BRAS2 and the BRAS3 are connected to the Controller via the real physical link or the routability logical path.

Example Embodiment 3

Figure 12:
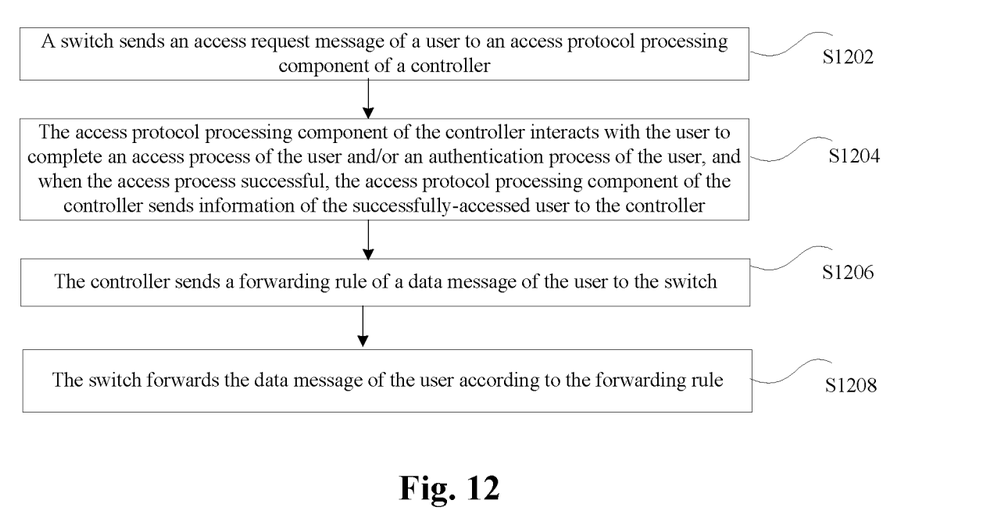
FIG. 12 is a flow chart of a method under a device fault user switching scenario according to an example embodiment of the present disclosure.
Figure 13:
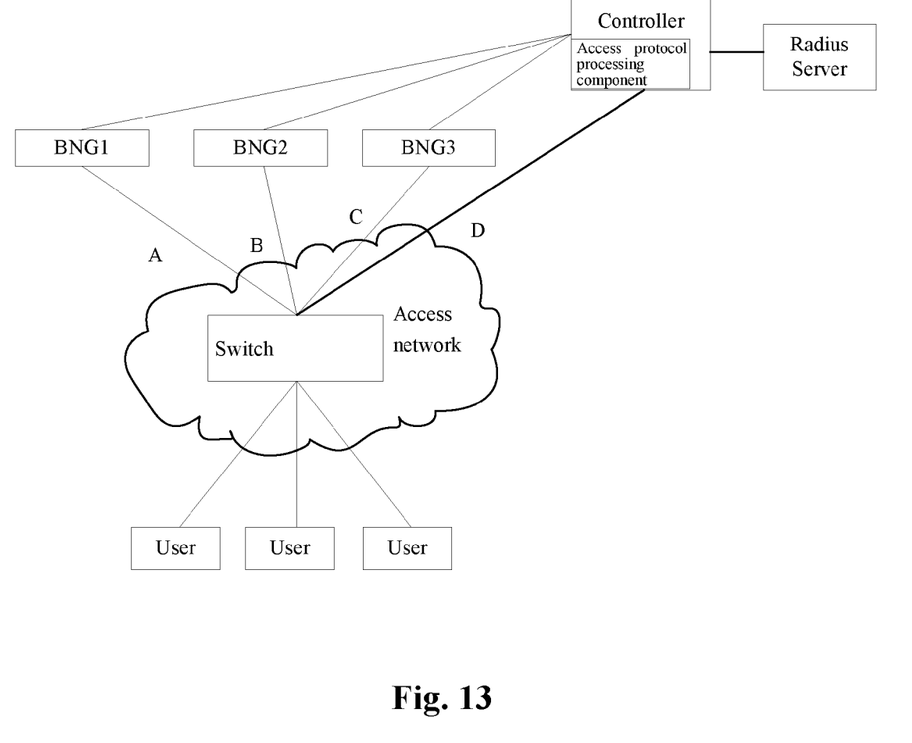
FIG. 13 is a diagram illustrating networking of a device fault user switching scenario according to an example embodiment of the present disclosure.

In a device fault user switching scenario, FIG. 12 is a flow chart of a method under a device fault user switching scenario according to an example embodiment of the present disclosure, and FIG. 13 is a diagram illustrating networking of a device fault user switching scenario according to an example embodiment of the present disclosure. A controller in FIG. 13 is equivalent to a service node control device in the above embodiment, a BNG1, a BNG2 and a BNG3 are equivalent to service nodes in the above embodiment, a switch is equivalent to an access network device in the above embodiment, and the controller contains an access protocol processing device. The method shown in FIG. 12 includes the steps as follows.

Step S1202: A switch sends an access request message of a user to an access protocol processing component of a controller.

Step S1204: The access protocol processing component of the controller interacts with the user to complete an access process of the User and/or an authentication process of the user, and when the access process is successful, the access protocol processing component of the controller sends information of the successfully-accessed user to the controller.

Furthermore, the access protocol processing component of the controller interacts with a Radius server in an authentication process to perform user authentication information verification.

Step S1206: The controller sends a forwarding rule of a data message of the user to the switch.

Furthermore, the controller performs load sharing among a BRAS1, a BRAS2 and a BRAS3 according to information of the currently-accessed user, and appoints a service node (such as the BRAS1) for the newly-accessed user.

Furthermore, a matching condition of the rule includes source address information of the user.

Furthermore, the controller sends the information of the newly-accessed user to both the appointed service node (such as the BRAS1) and a backup node (such as the BRAS2) of the appointed service node.

Furthermore, the backup node of the service node is dynamically appointed by the service control device or appointed in a static configuration mode.

Step S1208: The switch forwards the data message of the user according to the forwarding rule.

Furthermore, the service node processes the data message of the user according to the information of the newly-accessed user.

Furthermore, the access protocol processing component of the controller is a device independent of the controller, or the access protocol processing component of the controller is a part of the controller.

Furthermore, the switch is connected to the controller via a link D, wherein the link D is a real physical link or a routability logical path.

Furthermore, the BRAS1, the BRAS2 and the BRAS3 are connected to the controller via the real physical link or the routability logical path.

Example Embodiment 4

Figure 14:
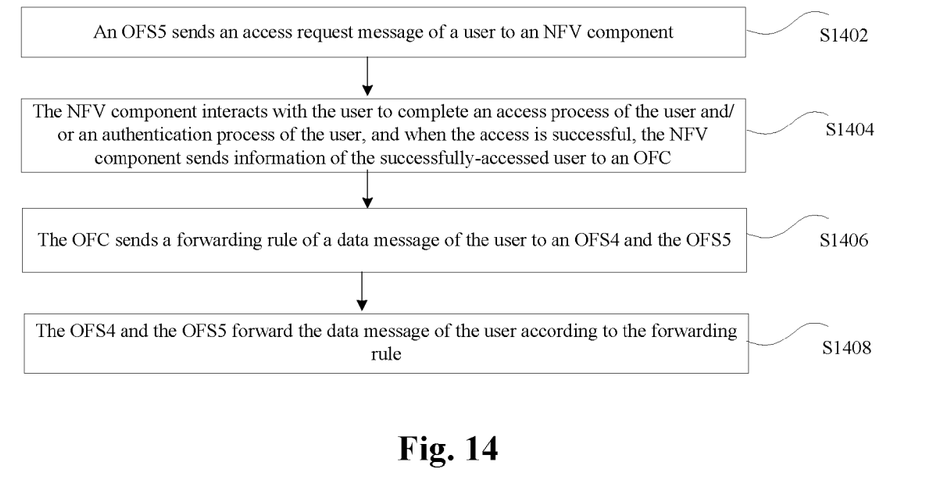
FIG. 14 is a flow chart of a adjusting method under a priority scenario according to an example embodiment of the present disclosure.
Figure 15:
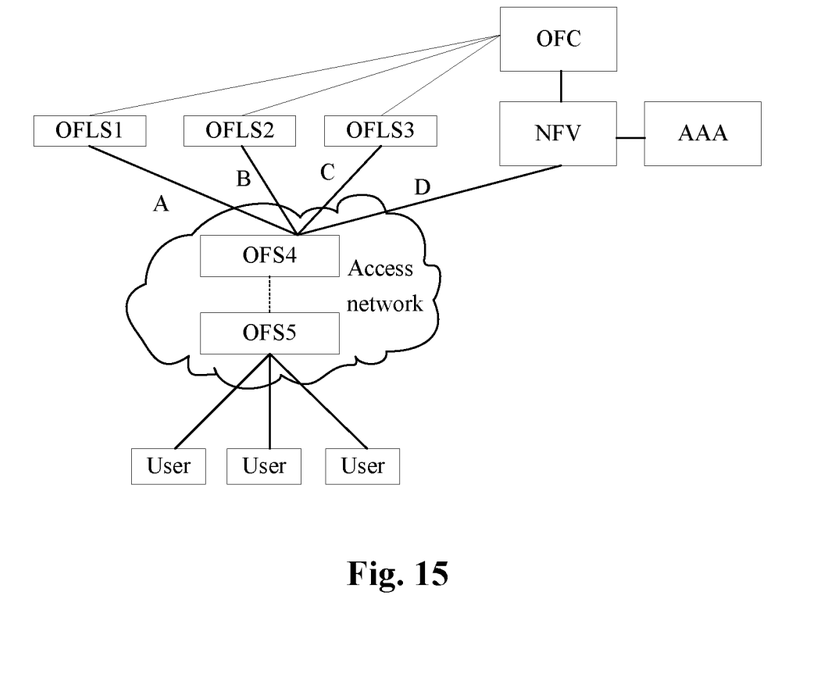
FIG. 15 is a diagram illustrating networking of a priority adjustment scenario according to an example embodiment of the present disclosure.

In a priority adjustment scenario, FIG. 14 is a flow chart of an adjusting method under a priority scenario according to an example embodiment of the present disclosure, and FIG. 15 is a diagram illustrating networking of a priority adjustment scenario according to an example embodiment of the present disclosure. An OpenFlow Controller (OFC) in FIG. 15 is equivalent to a service node control device in the above embodiment, an OFLS1, an OFLS2 and an OFLS3 are equivalent to service nodes in the above embodiment, an OFS4 and an OFS5 are equivalent to access network devices in the above embodiment, and a Network Function Virtual (NFV) component is equivalent to an access protocol processing device in the above embodiment. As shown in FIG. 14, the flow includes the steps as follows.

Step S1402: An OFS5 sends an access request message of a user to an NFV component.

Step S1404: The NFV component interacts with the user to complete an access process of the user and/or an authentication process of the user, and when the process of access is successful, the NFV component sends information of the successfully-accessed user to an OFC.

Furthermore, the NFV component interacts with an AAA server in an authentication process to perform user authentication information verification.

Step S1406: The OFC sends a forwarding rule of a data message of the user to an OFS4 and the OFS5.

Furthermore, the OFC performs load sharing between all service nodes according to information of currently-accessed user, and appoints a service node for the newly-accessed user or specific service traffic of the newly-accessed user.

Furthermore, the OFC appoints identical or different service nodes for different types of specific service traffics of the newly-accessed user to be processed.

Furthermore, a matching condition of the rule includes source address information and/or destination address information of the user.

Furthermore, the OFC sends the information of the newly-accessed user or specific traffic information of the newly-accessed user to both the appointed service node and a backup node of the appointed service node.

Furthermore, the backup node of the service node is dynamically appointed by the service control device or appointed in a static configuration mode.

Furthermore, the information of the newly-accessed user includes authorization information of the newly-accessed user.

Step S1408: The OFS4 and the OFS5 forward the data message of the user according to the forwarding rule.

Furthermore, the service node processes the data message of the user according to the user information of the newly-accessed or the specific traffic information of the newly-accessed user.

Furthermore, the NFV component is a device independent of the OFC, or the NFV component is a part of the OFC.

In conclusion, the technical solution provided by the embodiments of the present disclosure achieves the effects as follows. The problems, in the related art, of difficult expansion, difficult management and the like in a solution of sharing a network resource are solved. The unified management on large-scale service node resources is implemented, the above problems are effectively solved, and the user management efficiency and the differentiated service quality are improved. Moreover, the utilization efficiency of resources between service nodes is also improved, and the differentiated service quality and the user experience are effectively improved.

Obviously, those skilled in the art shall understand that all components or all steps in the present disclosure may be implemented by using a general calculation apparatus, may be centralized on a single calculation apparatus or may be distributed on a network composed of a plurality of calculation apparatuses. Optionally, they may be implemented by using executable program codes of the calculation apparatuses. Thus, they may be stored in a storage apparatus and executed by the calculation apparatuses, the shown or described steps may be executed in a sequence different from this sequence under certain conditions, or they are manufactured into each integrated circuit component respectively, or a plurality of components or steps therein are manufactured into a single integrated circuit component. Thus, the present disclosure is not limited to the combination of any specific hardware and software.

The above is only the preferred embodiments of the present disclosure, and is not intended to limit the present disclosure. There may be various modifications and variations in the present disclosure for those skilled in the art. Any modifications, equivalent replacements, improvements and the like within the spirit and principle of the present disclosure shall fall within the protection scope of the present disclosure.

INDUSTRIAL APPLICABILITY

The technical solution provided by the present disclosure may be applied to a shared processing process of a network resource. The technical solution is adopted as follows: an access protocol message of a user forwarded by an access network device according to a first forwarding rule is received, access authentication is performed on a first user according to the access protocol message, and a second forwarding rule, configured to indicate a rule adopted when the access network device forwards a data message of the first user to a service node in a network, is sent to the access network device after the authentication is passed. The problems, in the related art, of difficult expansion, difficult management and the like in a solution of sharing a network resource are solved. The unified management on large-scale service node resources is implemented, the above problems are effectively solved, and the user management efficiency and the differentiated service quality are improved.

What is claimed is:

1. A method for processing to share network resources, comprising:
sending a first forwarding rule to an access network device in a network, wherein the first forwarding rule is configured to indicate a rule adopted when the access network device forwards an access protocol message of a first user;
receiving the access protocol message, wherein the access protocol message is forwarded by the access network device according to the first forwarding rule; and
performing access authentication on the first user according to the received access protocol message, and after the access authentication is passed, sending a second forwarding rule to the access network device, wherein the second forwarding rule is configured to indicate a rule adopted when the access network device forwards a data message of the first user to a service node in the network.

2. The method as claimed in claim 1, before sending the second forwarding rule to the access network device, further comprising:
acquiring user information of the first user, and acquiring the second forwarding rule according to the acquired user information.

3. The method as claimed in claim 2, wherein the user information comprises: authorization information of the first user.

4. The method as claimed in claim 1, wherein performing the access authentication on the first user according to the received access protocol message comprises:
performing the access authentication on the first user according to the access protocol message by means of interaction with an Authorization/Authentication/Accounting (AAA) server.

5. The method as claimed in claim 1, after sending the second forwarding rule to the access network device, further comprising:
acquiring load sharing information of a second user bearing between service nodes, wherein the second user belongs to other users, except the first user, among users having accessed the network; and
allocating a service node to the first user or an appointed service flow of the first user according to the load sharing information.

6. The method as claimed in claim 5, wherein after allocating the service node to the first user or the appointed service flow of the first user according to the load sharing information, further comprising:
sending user information of the first user or information of the appointed service flow of the first user to the allocated service node.

7. The method as claimed in claim 6, when sending the information of the first user or the information of the appointed service flow of the first user to the allocated service node, further comprising:
sending the user information or the information of the appointed service flow to a backup node of the service node.

8. The method as claimed in claim 7, wherein the backup node is determined in at least one of following modes:
a pre-configuration mode and a dynamic allocation mode.

9. The method as claimed in claim 1, wherein the second forwarding rule carries following information:
source address information of the first user, and/or destination address information of the first user.

10. The method as claimed in claim 1, wherein
the access network device comprises at least one of:
an Ethernet switch; a router; an OpenFlow Logical Switch (OFLS); an OpenFlow Switch (OFS); an Optical Line Terminal (OLT); a Digital Subscriber Line Access Multiplexer (DSLAM); a Residential Gateway (RG); and a Customer Premise Equipment (CPE);
or,
the service node comprises at least one of: a Broadband Remote Access Server (BRAS); a Broadband Network Gateway (BNG); a Broadband Service Gateway (BSG); a Service Router (SR); a Broadband Access Server (BAS); an OpenFlow Logical Switch (OFLS); an OpenFlow Switch (OFS).

11. A device for sharing network resources, comprising:
a first sending component, configured to send a first forwarding rule to an access network device in a network, wherein the first forwarding rule is configured to indicate a rule adopted when the access network device forwards an access protocol message of a first user;
a receiving component, configured to receive the access protocol message, wherein the access protocol message is forwarded by the access network device according to the first forwarding rule;
an authentication component, configured to perform access authentication on the first user according to the received access protocol message; and
a second sending component, configured to send, after the access authentication is passed, a second forwarding rule to the access network device, wherein the second forwarding rule is configured to indicate a rule adopted when the access network device forwards a data message of the first user to a service node in the network.

12. The device as claimed in claim 11, further comprising:
an acquiring component, configured to acquire load sharing information of a second user bearing between service nodes, wherein the second user belongs to other users, except the first user, among users having accessed the network; and
an allocation component, configured to allocate a service node to the first user or an appointed service flow of the first user according to the load sharing information.

13. A system for sharing network resources, comprising:
an access protocol processing device, configured to receive an access protocol message of a first user from an access network device, and perform access authentication on the first user according to the received access protocol message;
a service node control device, configured to send a first forwarding rule and a second forwarding rule to the access network device, wherein the first forwarding rule is configured to indicate a rule adopted when the access network device forwards the access protocol message of the first user;
the access network device, configured to receive the first forwarding rule and the second forwarding rule, forward the access protocol message of the first user to the access protocol processing device according to the first forwarding rule, and forward a data message of the first user to a service node in a network according to the second forwarding rule; and
the service node, configured to receive the data message.

14. The method as claimed in claim 2, wherein
the access network device comprises at least one of: an Ethernet switch; a router; an OpenFlow Logical Switch (OFLS); an OpenFlow Switch (OFS); an Optical Line Terminal (OLT); a Digital Subscriber Line Access Multiplexer (DSLAM); a Residential Gateway (RG); and a Customer Premise Equipment (CPE);
or,
the service node comprises at least one of: a Broadband Remote Access Server (BRAS); a Broadband Network Gateway (BNG); a Broadband Service Gateway (BSG); a Service Router (SR); a Broadband Access Server (BAS); an OpenFlow Logical Switch (OFLS); an OpenFlow Switch (OFS).

15. The method as claimed in claim 3, wherein
the access network device comprises at least one of: an Ethernet switch; a router; an OpenFlow Logical Switch (OFLS); an OpenFlow Switch (OFS); an Optical Line Terminal (OLT); a Digital Subscriber Line Access Multiplexer (DSLAM); a Residential Gateway (RG); and a Customer Premise Equipment (CPE);
or,
the service node comprises at least one of: a Broadband Remote Access Server (BRAS); a Broadband Network Gateway (BNG); a Broadband Service Gateway (BSG); a Service Router (SR); a Broadband Access Server (BAS); an OpenFlow Logical Switch (OFLS); an OpenFlow Switch (OFS).

16. The method as claimed in claim 4, wherein
the access network device comprises at least one of: an Ethernet switch; a router; an OpenFlow Logical Switch (OFLS); an OpenFlow Switch (OFS); an Optical Line Terminal (OLT); a Digital Subscriber Line Access Multiplexer (DSLAM); a Residential Gateway (RG); and a Customer Premise Equipment (CPE);
or,
the service node comprises at least one of: a Broadband Remote Access Server (BRAS); a Broadband Network Gateway (BNG); a Broadband Service Gateway (BSG); a Service Router (SR); a Broadband Access Server (BAS); an OpenFlow Logical Switch (OFLS); an OpenFlow Switch (OFS).

17. The method as claimed in claim 5, wherein
the access network device comprises at least one of: an Ethernet switch; a router; an OpenFlow Logical Switch (OFLS); an OpenFlow Switch (OFS); an Optical Line Terminal (OLT); a Digital Subscriber Line Access Multiplexer (DSLAM); a Residential Gateway (RG); and a Customer Premise Equipment (CPE);
or,
the service node comprises at least one of: a Broadband Remote Access Server (BRAS); a Broadband Network Gateway (BNG); a Broadband Service Gateway (BSG); a Service Router (SR); a Broadband Access Server (BAS); an OpenFlow Logical Switch (OFLS); an OpenFlow Switch (OFS).

18. The method as claimed in claim 6, wherein
the access network device comprises at least one of: an Ethernet switch; a router; an OpenFlow Logical Switch (OFLS); an OpenFlow Switch (OFS); an Optical Line Terminal (OLT); a Digital Subscriber Line Access Multiplexer (DSLAM); a Residential Gateway (RG); and a Customer Premise Equipment (CPE);
or,
the service node comprises at least one of: a Broadband Remote Access Server (BRAS); a Broadband Network Gateway (BNG); a Broadband Service Gateway (BSG); a Service Router (SR); a Broadband Access Server (BAS); an OpenFlow Logical Switch (OFLS); an OpenFlow Switch (OFS).

19. The method as claimed in claim 7, wherein
the access network device comprises at least one of: an Ethernet switch; a router; an OpenFlow Logical Switch (OFLS); an OpenFlow Switch (OFS); an Optical Line Terminal (OLT); a Digital Subscriber Line Access Multiplexer (DSLAM); a Residential Gateway (RG); and a Customer Premise Equipment (CPE);
or,
the service node comprises at least one of: a Broadband Remote Access Server (BRAS); a Broadband Network Gateway (BNG); a Broadband Service Gateway (BSG); a Service Router (SR); a Broadband Access Server (BAS); an OpenFlow Logical Switch (OFLS); an OpenFlow Switch (OFS).

20. The method as claimed in claim 8, wherein
the access network device comprises at least one of: an Ethernet switch; a router; an OpenFlow Logical Switch (OFLS); an OpenFlow Switch (OFS); an Optical Line Terminal (OLT); a Digital Subscriber Line Access Multiplexer (DSLAM); a Residential Gateway (RG); and a Customer Premise Equipment (CPE);
or,
the service node comprises at least one of: a Broadband Remote Access Server (BRAS); a Broadband Network Gateway (BNG); a Broadband Service Gateway (BSG); a Service Router (SR); a Broadband Access Server (BAS); an OpenFlow Logical Switch (OFLS); an OpenFlow Switch (OFS).

* * * * *